United States Patent
Ikeda

(10) Patent No.: US 8,360,191 B2
(45) Date of Patent: Jan. 29, 2013

(54) SUPPORT SYSTEM FOR POWER TRAIN OF VEHICLE

(75) Inventor: Tetsuya Ikeda, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 243 days.

(21) Appl. No.: 12/977,528

(22) Filed: Dec. 23, 2010

(65) Prior Publication Data

US 2011/0163220 A1     Jul. 7, 2011

(30) Foreign Application Priority Data

Jan. 7, 2010   (JP) ................ 2010-002086

(51) Int. Cl.
    *B60K 5/12*      (2006.01)
(52) U.S. Cl. ..................... 180/291; 180/300
(58) Field of Classification Search ............ 180/291, 180/292, 293, 299, 300; 248/636, 638, 674, 248/647, 664, 668; 123/192.1
    See application file for complete search history.

(56) References Cited

U.S. PATENT DOCUMENTS

| 5,437,344 A * | 8/1995 | Wada ............ 180/291 |
| 6,386,309 B1 * | 5/2002 | Park ............ 180/300 |
| 6,976,554 B2 * | 12/2005 | Tsuruda ............ 180/291 |

FOREIGN PATENT DOCUMENTS

| JP | 5-72543 | 3/1993 |
| JP | 6-122325 | 5/1994 |

\* cited by examiner

*Primary Examiner* — John Walters

(74) *Attorney, Agent, or Firm* — Barnes & Thornburg LLP

(57) ABSTRACT

A support system for a power train of a vehicle includes a mount insulator mounted to a vehicle body and provided with a coupling member, a mount bracket coupled with the coupling member. The mount bracket includes a first mount bracket portion extending upward from an upper portion of the power train and a second mount bracket portion extending horizontally from an upper end of the first mount bracket portion. The first mount bracket portion includes a first vertical wall portion extending in a longitudinal direction of the vehicle body and a second vertical wall portion intersects the first vertical wall portion and extends in the longitudinal direction of the vehicle body. First to fourth fastening members are formed to lower or upper end portions of the first and second vertical wall portions, respectively. A reinforcing member is formed integrally with the second mount bracket portion in a manner of connecting the third and fourth fastening members.

3 Claims, 7 Drawing Sheets

SUPPORT SYSTEM FOR POWER TRAIN OF VEHICLE

BACKGROUND OF THE INVENTION

1. Field of the Invention

The present invention relates to a support system for a power train of a vehicle, particularly, capable of reducing vibrations transmitted from a power train mounted to a vehicle to a vehicle body by increasing rigidity of a mount bracket which supports the power train on the vehicle body.

2. Description of the Related Art

In a some vehicle in which a transmission is coupled to an engine arranged transversely so as to support an engine and transmission on a vehicle body via a mount insulator (engine mount), a mount bracket which fixes the mount insulator on the side of the transmission to the transmission is split horizontally into two parts for the convenience of assembly.

An example of such a support system for a power train of a vehicle includes one shown in FIGS. 6 and 7, in which a power train 103 is composed of an engine 101 and a transmission 102, and the power train 103 is supported to the vehicle body through a mount insulator 105 of a support system 104.

The mount insulator 105 is provided with a outer cylindrical member (outer cylinder) 106, an elastic member 107 secured to an inner peripheral surface of the outer cylinder 106 and a shaft 108 disposed to a center of the elastic member 108. A coupling member (coupler) is connected to an end portion of the shaft 108 and an outer cylinder side mount member 109 is mounted to the outer periphery of the outer cylinder 106.

A mount bracket 111 is coupled to a top portion of a transmission casing 110 of the transmission 102. The mount bracket 111 is coupled to the coupler on the shaft 108 of the mount insulator 105. The mount insulator 105 couples the outer cylinder side mount member 109 of the outer cylinder 106 to the vehicle body.

The mount bracket 111 which couples the mount insulator 105 to the transmission 102 includes a first mount bracket portion 112 which extends upward from the top of the transmission casing 110 and a second mount bracket portion 113 which is coupled to the coupler on the shaft 108 by extending horizontally from an upper end portion of the first mount bracket portion 112.

The first mount bracket portion 112 includes a first vertical wall portion 115 and a second vertical wall portion 116 in a manner such that the first vertical wall portion 115 extends in a front-rear direction of the vehicle (i.e., longitudinal direction of the vehicle body) along a side portion of a shift tower 114 so as to be apart from the shift tower 114 which is a projection projecting upward from the transmission casing 110 while the second vertical wall portion 116 intersects the first vertical wall portion 115 by extending in lateral direction of the vehicle body along a side portion of the shift tower 114.

A first fastening member 117 and a second fastening member 118 are formed in lower end portions of the first vertical wall portion 115 and the second vertical wall portion 116, respectively, and are coupled to the upper portion of the transmission casing 110. The second mount bracket portion 113 includes a horizontal wall portion 119, which is fastened to an upper end portion of the first mount bracket portion 112 and coupled to the coupler at an end portion of the shaft 108 of the mount insulator 105.

In a conventional support system of a power train of a vehicle, an elastic member is mounted on a mount bracket so as to elastically come into press contact with a surface to which a transmission fastening surface cannot be formed (seat-surface-non-forming portion). The elastic member prevents the mount bracket from falling onto the seat-surface-non-forming portion to increase the coupling rigidity to thereby prevent vibration and noise from causing, for example, as disclosed in a Patent Document 1 (Japanese Utility Model Laid-Open Publication No. 5-72543).

Furthermore, in another conventional support system for a power train of a vehicle, a first fastening member to be coupled to a drive system member and a second fastening member which obliquely intersects a travel direction of the drive system member are formed on a mount-side bracket fixed to a mount insulator, and a slope to be coupled to the second fastening member is formed on an engine-side bracket fixed to the drive system member to thereby suppress decreasing in natural frequency of the mount insulator and prevent the vibration and noise from increasing, for example, as disclosed in a Patent Document 2 (Japanese Patent Laid-Open Publication No. 6-122325).

In the support system 104 for the power train of the vehicle shown in FIGS. 6 and 7, since the shift tower 114 of the transmission 102 exists around the mount bracket 111, the first mount bracket portion 112 of the mount bracket 111 is constructed to have a clearance (i.e., a shape having an escape clearance) in order for the first vertical wall portion 115 and the second vertical wall portion 116 so as to avoid contacting to the shift tower 114. If the first mount bracket portion 112 needs to provide a clearance in this way, a portion to which the clearance is formed will lack strength and rigidity. As a result, a (hatched region in FIG. 7) of the first mount bracket portion 112, which is coupled to the second mount bracket portion 113, will vibrate as indicated by an arrow, and the vibration will be transmitted to the vehicle body, thus being inconvenient.

Conventionally, as a countermeasure to the lack of strength and rigidity, a material with high strength and high rigidity is used for forming the first mount bracket portion, or conventionally, the first mount bracket portion and second mount bracket portion are fastened by using a separate stiffener for reinforcement, which however provides the following disadvantages.

That is, when the material is changed, for example, from aluminum to cast iron, entire weight of the system increases and the material change resulted in cost increasing. On the other hand, when a stiffener is added, the number of parts or components is increased, resulting in cost increasing.

SUMMARY OF THE INVENTION

The present invention was conceived in consideration of the circumstances of the prior art mentioned above, and an object thereof is to provide a support system for a power train of a vehicle capable of suppressing vibrations of a first mount bracket portion and reducing the vibrations transmitted from the power train to the vehicle body without changing material of parts or components and increasing the number thereof, as well as preventing cost increasing.

The above and other objects can be achieved by providing, in one aspect of the present invention, a support system for a power train of a vehicle having a vehicle body which is mounted with a power train including an engine and a transmission, the support system comprising:

a mount insulator mounted to the vehicle body and provided with a coupling member;

a mount bracket coupled with an end portion of a shaft extending in a vertical direction of the vehicle body by way of the coupling member, the mount bracket including: a first mount bracket portion extending upward from an upper portion of the power train having a projection projecting upward therefrom; and a second mount bracket portion extending horizontally from an upper end of the first mount bracket portion and coupled to the coupling member, in which the first mount bracket portion includes: a first vertical wall portion extending in a longitudinal direction of the vehicle body along a side portion of the projection projecting upward from the power train so as not to contact the first vertical wall portion; and a second vertical wall portion intersects the first vertical wall portion and extends in the longitudinal direction of the vehicle body along the side portion of the projection;

first and second fastening members formed to lower end portions of the first and second vertical wall portions, respectively, the first and second fastening members being coupled with the power train;

third and fourth fastening members fastening the second mount bracket portion to an upper end portion of the first vertical wall portion apart from the second vertical wall portion and to an upper end portion of the second vertical wall portion apart from the first vertical wall portion, respectively, as viewed from an upper side of the vehicle body; and a reinforcing member formed integrally with the second mount bracket portion in a manner of connecting the third and fourth fastening members to each other by straddling over the projection formed to the power train.

In a preferred embodiment, it may be desired that the end portion opposite to the end portion at which the third fastening member of the first vertical wall portion is provided, or the end portion opposite to the end portion at which the fourth fastening member of the second vertical wall portion is provided is disposed so as to project from an intersecting portion between the first vertical wall portion and the second vertical wall portion.

The support system may further include: a fifth fastening member adapted to fasten the second mount bracket portion and disposed at the end portion of the first vertical wall portion opposite to the third fastening member or the end portion of the second vertical wall portion opposite to the fourth fastening member; and a further reinforcing member adapted to couple the fifth fastening member and the third fastening member or to couple the fifth fastening member and the fourth fastening member, the second reinforcing member being formed integrally with the second mount bracket portion.

According to the support system for a power train of a vehicle of the structure and characters mentioned above, the end portion of the first vertical wall portion and the end portion of the second vertical wall portion are coupled to each other by way of the reinforcing member formed integrally with the second mount bracket portion to thereby suppress the vibration of the first vertical wall portion and the second vertical wall portion. Therefore, the support system for the power train of the present invention can increase resonance frequency of the first mount bracket portion, thus reducing the vibration transmitted from the power train to a vehicle body without changing material, increasing the number of parts or components, or increasing manufacturing cost.

The nature and further characteristic features of the present invention will be made clearer from the following descriptions made with reference to the accompanying drawings.

DESCRIPTION OF THE PREFERRED EMBODIMENT

An embodiment of the present invention will be described below with reference to the accompanying drawings of figures FIGS. 1 to 5, in which terms of "upper", "lower", "right", "left" and the like terms showing direction are based on arrowed directions or in the illustrated state in respective figures.

[Embodiment]

Figure 1:
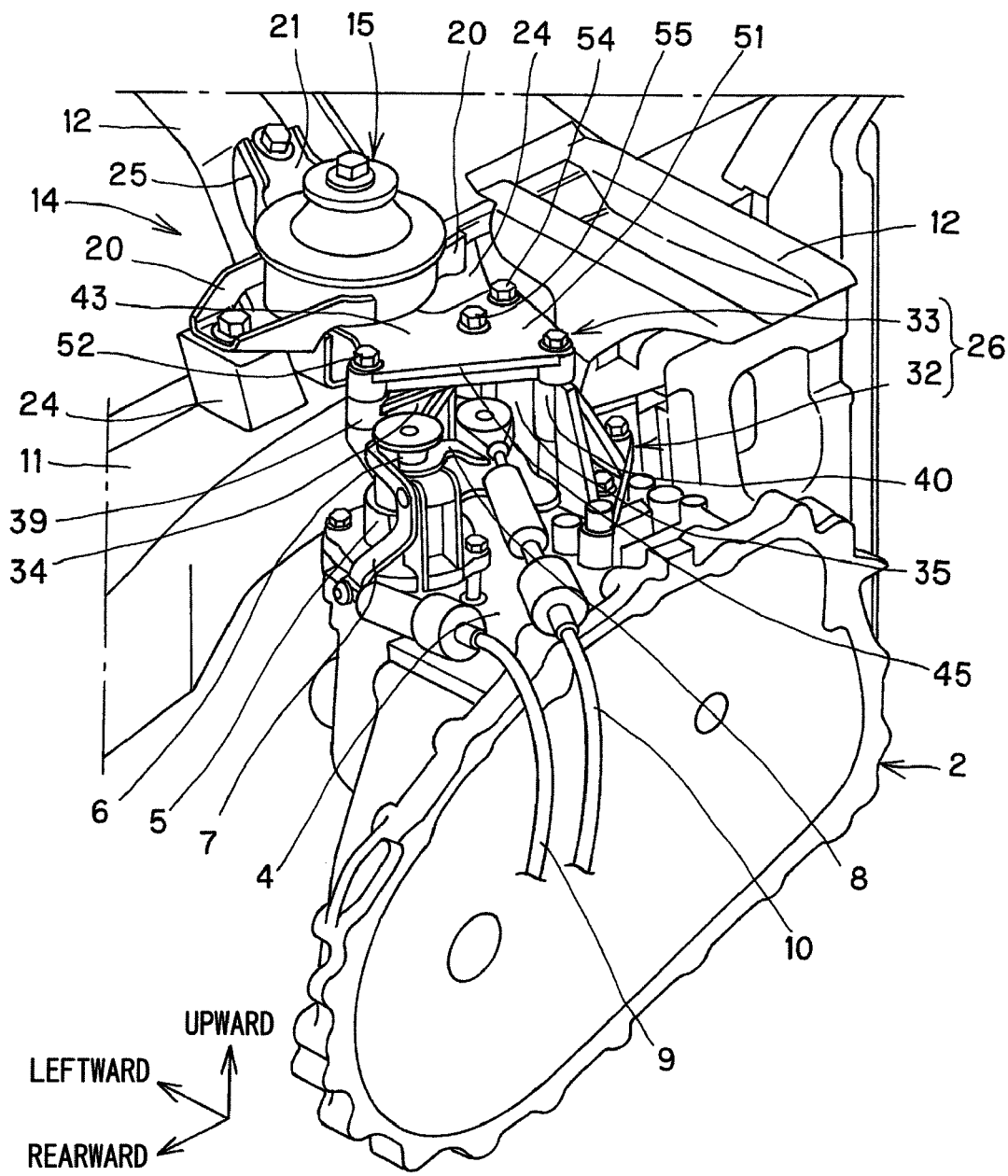
FIG. 1 is a perspective view of a support system for a power train of a vehicle according to one embodiment of the present invention as viewed from a right rear portion of a vehicle body.
Figure 2:
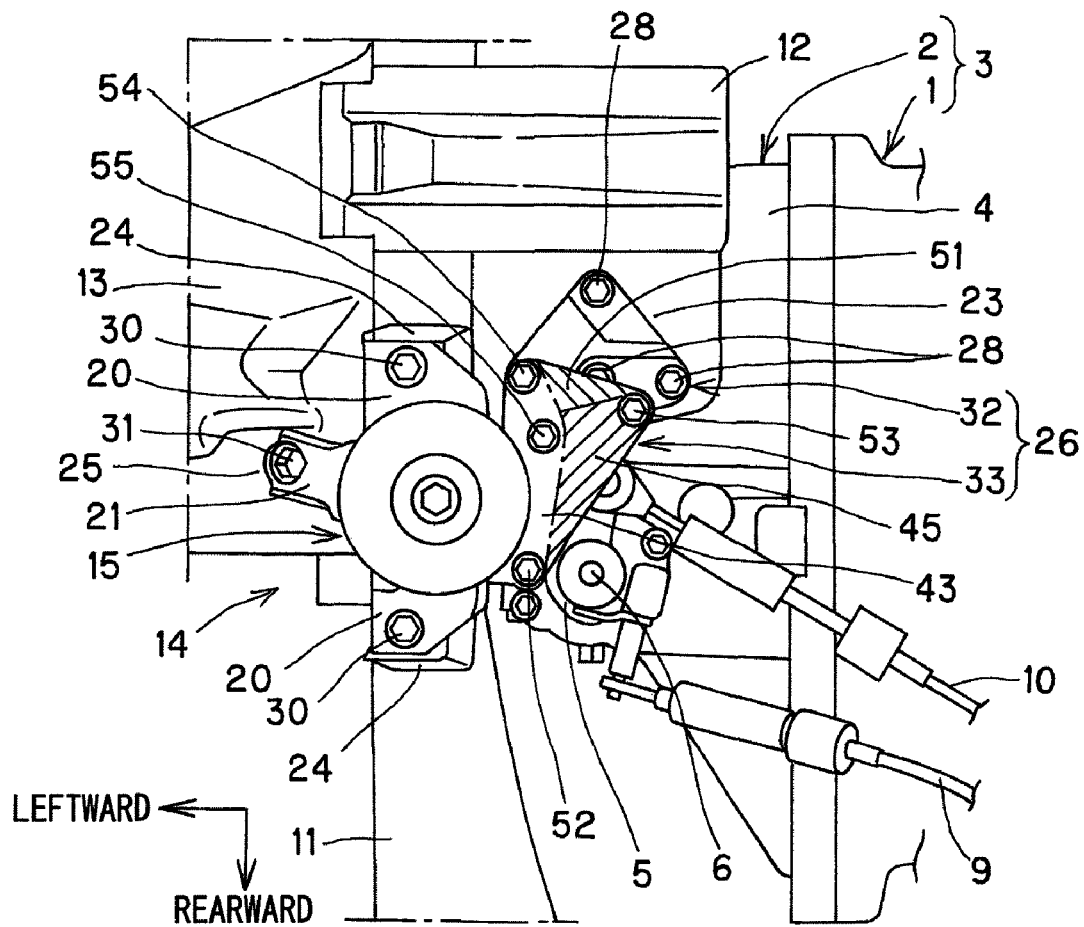
FIG. 2 is a plan view of the support system according to the embodiment of FIG. 1.

FIGS. 1 to 5 show an embodiment of the present invention. In FIGS. 1 to 2, a power train 3 of a vehicle is arranged in a manner in which an engine 1 is transversely disposed and a transmission 2 is coupled to the left side of the engine 1 in a lateral (width) direction of the vehicle body.

The transmission 2 includes a shift tower 5 which is a projection projecting upward formed to an upper portion of a transmission casing 4. The shift tower 5 supports a shift-and-select shaft 6 for gear shifting in an axially and circumferentially movable manner. A select lever 7 and a shift lever 8 are coupled at one end to the shift-and-select shaft 6. The select lever 7 and the shift lever 8 are connected at the other end to a select cable 9 and shift cable 10, respectively.

The transmission 2 shifts gears (gear stages) by moving the shift-and-select shaft 6 in an axial direction and a circumferential direction via the select cable 9 and the shift cable 10, respectively, by using the select lever 7 and the shift lever 8.

With the transmission 2 of the power train, the transmission casing 4 is brought close to a left side frame 11 of the vehicle body, the shift tower 5 formed as a projection from the upper portion of the transmission casing 4 is placed between the left side frame 11 and a battery bracket 12 coupled to the left side frame 11, and the transmission 2 of the power train 3 is supported by the left side frame 11 of the vehicle body and a left apron panel 13 coupled to the left side frame 11 through a mount insulator (engine mount) 15 of the support system 14.

Figure 3:
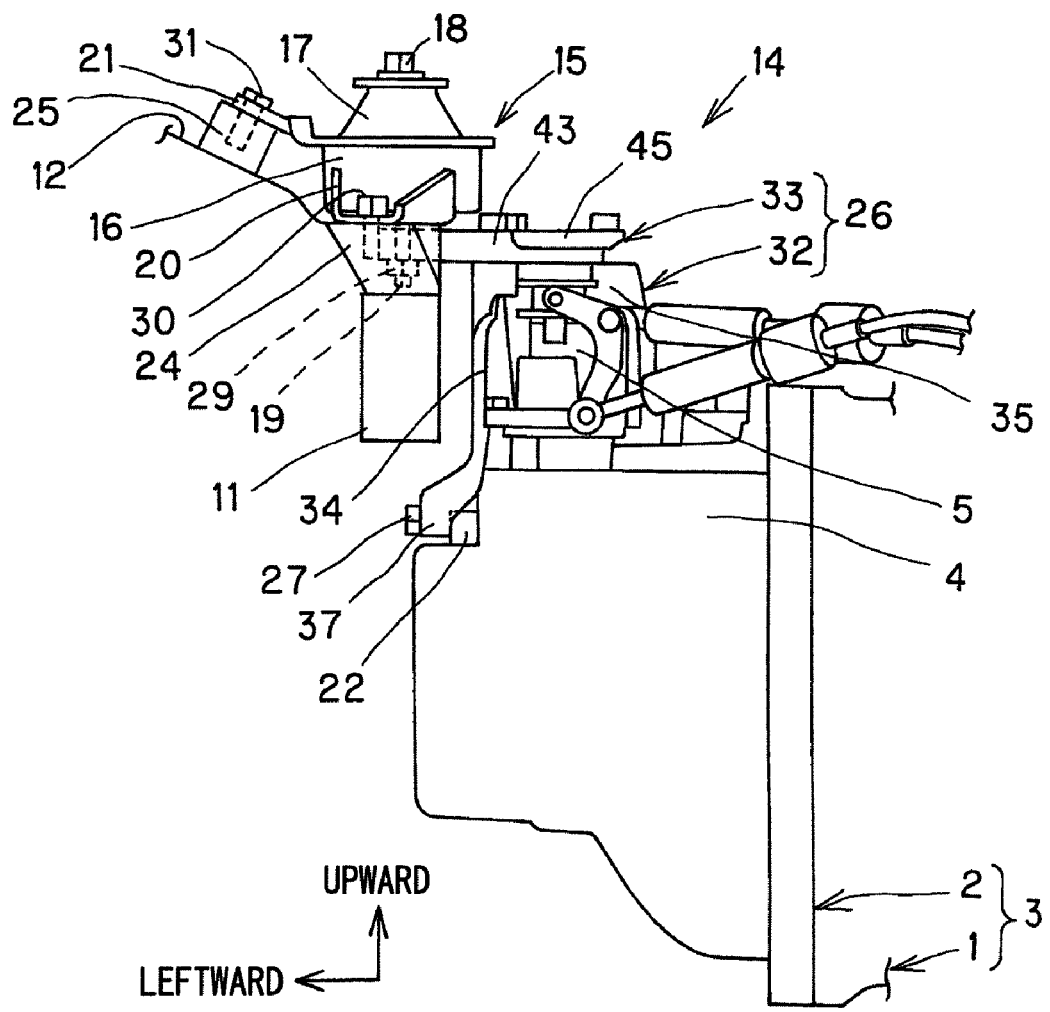
FIG. 3 is a rear side view of the support system according to the embodiment of FIG. 1.
Figure 4:
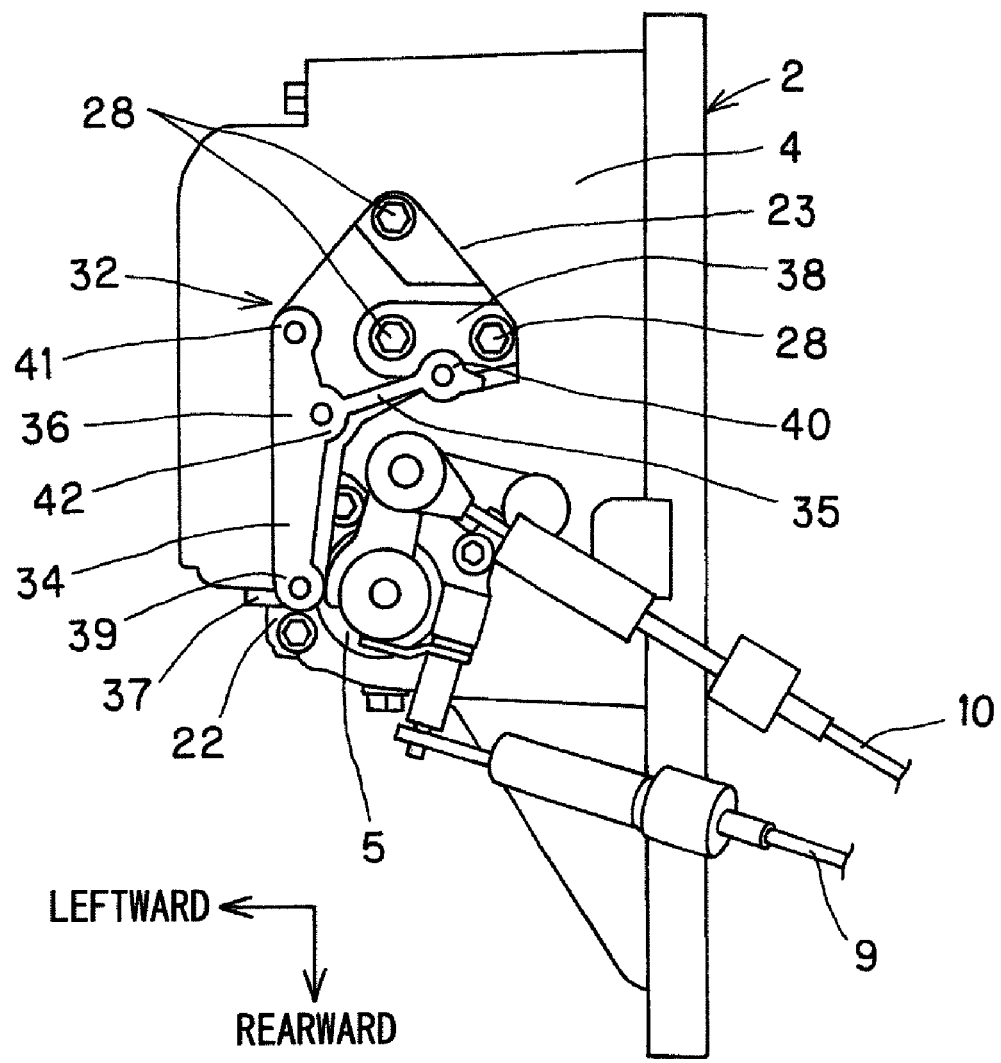
FIG. 4 is a plan view of the support system according to the embodiment of FIG. 1 from which a second mount bracket portion is removed.

As shown in FIGS. 3 and 4, the mount insulator 15 includes an outer cylinder 16, an elastic body 17 firmly fixed to an inner peripheral portion of the outer cylinder 16 and a shaft 18 disposed to a center of the elastic body 17. A coupler 19 is attached to a lower end portion of the shaft 18 in the vertical direction of the vehicle body. Outer cylinder-side fittings 20 and 21 are installed on an outer peripheral portion of the outer cylinder 16. The transmission 2 supported by the mount insulator 15 has casing-side fittings 22 and 23 installed on upper portion of the transmission casing 4. A frame-side fitting 24 and a panel-side fitting 25 are provided on the left side frame 11 and the left apron panel 13 to which the mount insulator 15 is mounted.

The transmission 2 has a mount bracket 26 coupled to the casing-side fittings 22 and 23 on the upper portion of the transmission casing 4 by means of mounting bolts 27 and 28, respectively. The coupler 19 on the shaft 18 of the mount insulator 15 is coupled to the mount bracket 26 by means of a mounting nut 29. In the mount insulator 15, the outer cylinder-side fittings 20 and 21 on the outer cylinder 16 are coupled to the frame-side fitting 24 and the panel-side fitting 25 by means of the mounting bolts 30 and 31.

According to the structure described above, the transmission 2 of the power train 3 is supported by the left side frame 11 and the left apron panel 13 of the vehicle body via the mount insulator 15 of the support system 14.

Figure 5:
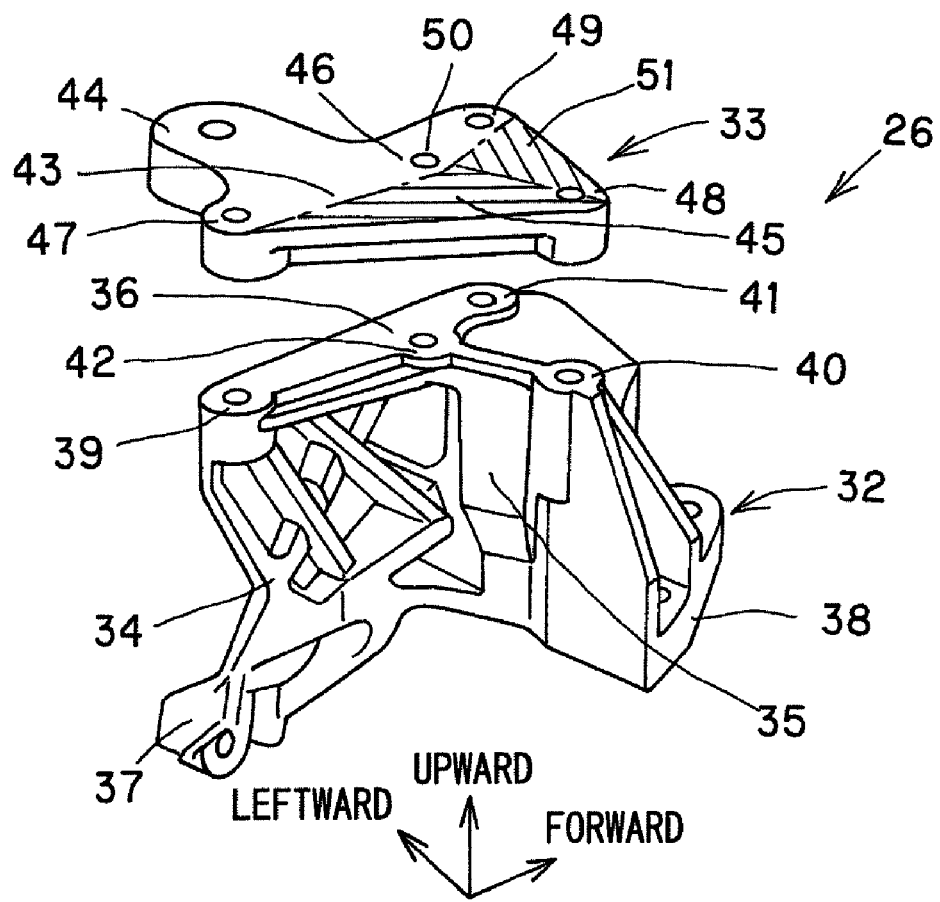
FIG. 5 is a perspective view of a mount bracket in a disassembled state as viewed from the right rear side of the vehicle body.
Figure 6:
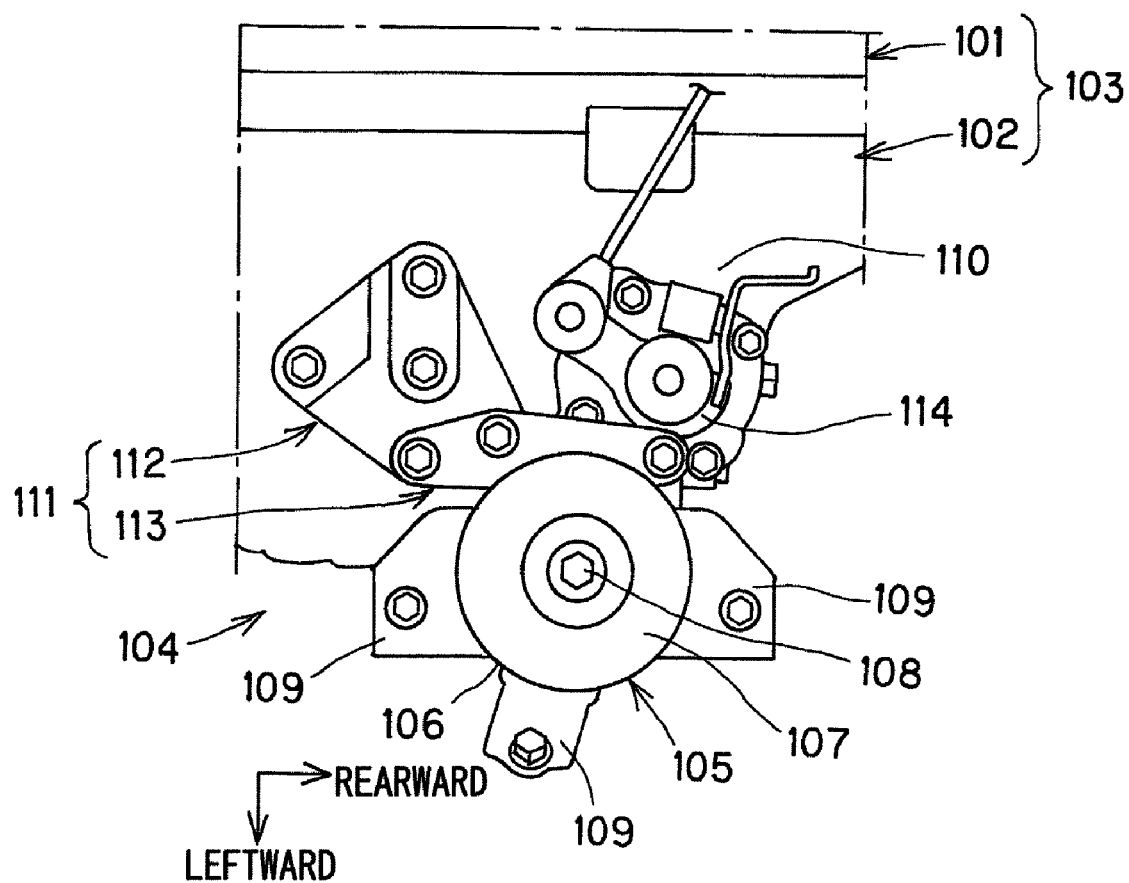
FIG. 6 is a plan view of a conventional support system for a power train of a vehicle.
Figure 7:
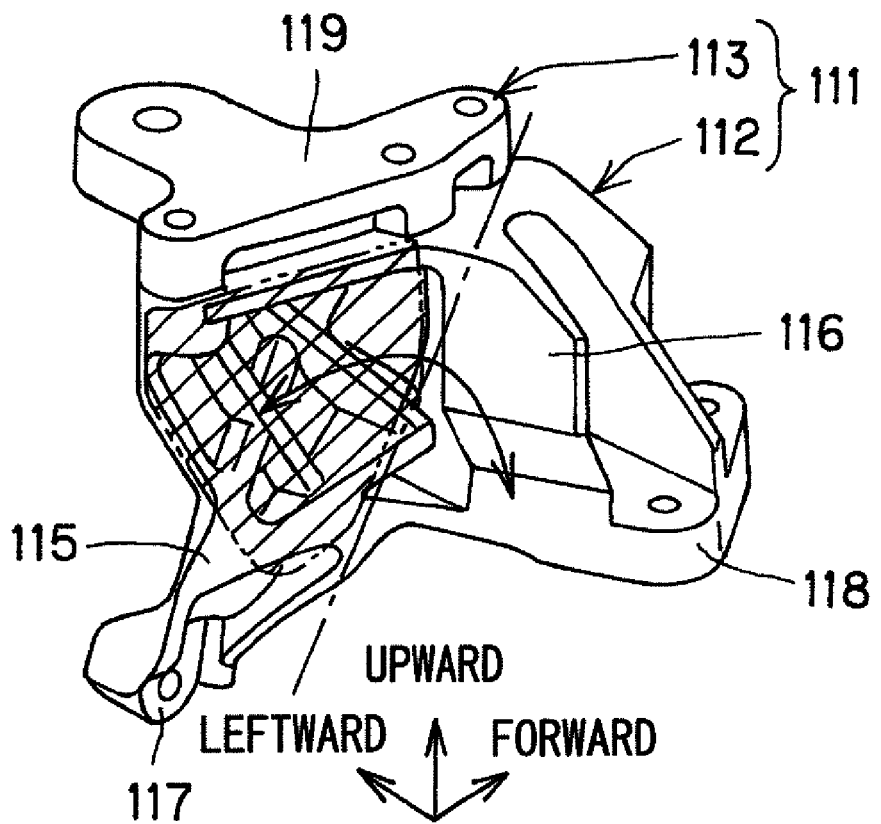
FIG. 7 is a perspective view of the conventional support system including a mount bracket in an assembled state as viewed from the right rear side of the vehicle body.

As shown in FIG. 5, the mount bracket 26 which couples the mount insulator 15 to the transmission casing 4 includes a first mount bracket portion 32 extending upward from the top of the transmission casing 4 and a second mount bracket portion 33 which extends horizontally from an upper end portion of the first mount bracket portion 32 and is coupled to the coupler 19 for the shaft 18.

The first mount bracket portion 32 includes a first vertical wall portion 34 and a second vertical wall portion 35, so that the first vertical wall portion 34 extends in the longitudinal direction of the vehicle body along a side portion of the shift tower 5 so as to avoid the contacting to the shift tower 5 projecting upward from the transmission casing 4. On the other hand, the second vertical wall portion 35 intersects the first vertical wall portion 34 and extends in the longitudinal direction of the vehicle body along the side portion of the shift tower 5.

Longitudinal ends of the first vertical wall portion 34 and second vertical wall portion 35 are interconnected by intersecting each other at an intersecting portion 36. At the other longitudinal ends apart from the intersecting portion 36, a first fastening member 37 and a second fastening member 38 are formed in lower end portions of the first vertical wall portion 34 and second vertical wall portion 35, respectively. The first fastening member 37 and the second fastening member 38 are coupled to the casing-side fittings 22 and 23, respectively, on the upper portion of the transmission casing 4 by using mounting bolts 27 and 28, respectively.

As shown in FIG. 4, as viewed from the upper side of the vehicle, in the first mount bracket portion 32, a third fastening member 39 and a fourth fastening member 40 are arranged, respectively, to the upper end portion of the first vertical wall portion 34 apart from the intersecting portion 36 with the second vertical wall portion 35 and to the upper end portion of the second vertical wall portion 35 apart from the intersecting portion 36 with the first vertical wall portion 34 so as to fasten the second mount bracket portion 33.

As shown in FIG. 5, the first mount bracket portion 32 is configured such that the end portion opposite to the end portion to which the third fastening member 39 of the first vertical wall portion 34 is formed projects from the intersecting portion 36 of the first and second wall portions 34 and 35. In the first mount bracket portion 32, a fifth fastening member 41 adapted to fasten the second mount bracket portion 33 is placed to the end portion of the first vertical wall portion 34 opposite the third fastening member 39 interposing the intersecting portion 36 of the first vertical wall portion 34. Furthermore, in the first mount bracket portion 32, a sixth fastening member 42 adapted to fasten the second mount bracket portion 33 is mounted to the intersecting portion 36 between the first vertical wall portion 34 and second vertical wall portion 35.

As shown in FIG. 5, the second mount bracket portion 33 includes a horizontal wall portion 43 elongated in the longitudinal direction of the vehicle body and having a shape corresponding to that of the first vertical wall portion 34 of the first mount bracket portion 32. A mount fastening member 44 is placed on the left side of the horizontal wall portion 43 along the longitudinal direction of the vehicle body. As shown in FIG. 3, the mount fastening member 44 is coupled to the coupler 19 on the shaft 18 of the mount insulator 15 by means of the mounting nut 29.

The second mount bracket portion 33 is integrally formed with a reinforcing member 45 located on the right side of the horizontal wall portion 43 along the longitudinal direction of the vehicle body. The reinforcing member 45 is shaped in the form of a triangular plate and adapted to couple the third fastening member 39 and the fourth fastening member 40 of the first mount bracket portion 32 in a manner of straddling the shift tower 5.

At the longitudinal end of the horizontal wall portion 43, the second mount bracket portion 33 is provided with an intersecting portion 46 corresponding to the intersecting portion 36 of the first mount bracket portion 32. At the other longitudinal end apart from the intersecting portion 46 of the horizontal wall portion 43, the second mount bracket portion 33 is provided with a third fastening member 47 corresponding to the third fastening member 39 of the first mount bracket portion 32. Furthermore, on the leading edge side of the reinforcing member 45, which is most apart in the right side from the intersecting portion 46 of the horizontal wall portion 43 along the lateral direction of the vehicle, the second mount bracket portion 33 is provided with a fourth fastening member 48 corresponding to the fourth fastening member 40 of the first mount bracket portion 32.

The second mount bracket portion 33 is configured such that the end portion of the horizontal wall portion 43, opposite to the side on which the third fastening member 47 is placed, projects from the intersecting portion 46. In the end portion of the horizontal wall portion 43 on the opposite side of the intersecting portion 46 from the third fastening member 47, the second mount bracket portion 33 is provided with a fifth fastening member 49 corresponding to the fifth fastening member 41 of the first mount bracket portion 32.

Further, at the intersecting portion 46 of the horizontal wall portion 43, the second mount bracket portion 33 is formed with a sixth fastening member 50 corresponding to the sixth fastening member 42 of the first mount bracket portion 32. Furthermore, the second mount bracket portion 33 is integrally formed with a second reinforcing member 51 having substantially a triangular plate shape connecting between the fifth and fourth fastening member 41 and 40 of the first mount bracket portion 33. This reinforcing member 51 is located on the right side of the horizontal wall portion 43, projecting on the side opposite to the third fastening member 47 with the intersecting portion 46 being interposed therebetween. Further, the second reinforcing member 51 is integrally formed with the reinforcing member 45.

The mount bracket 26 has following structures.

The second mount bracket portion 33 abuts against the upper end portion of the first mount bracket portion 32, and as shown in FIG. 2, the third fastening member 39 of the first mount bracket portion 32 and the third fastening member 47 of the second mount bracket portion 33 are coupled to each other by means of the mounting bolt 52. The fourth fastening member 40 of the first mount bracket portion 32 and the fourth fastening member 48 of the second mount bracket portion 33 are also coupled to each other by means of the mounting bolt 53, and the fifth fastening member 41 of the first mount bracket portion 32 and the fifth fastening member 49 of the second mount bracket portion 33 are also coupled to each other by means of the mounting bolt 54. Furthermore, the sixth fastening member 42 of the first mount bracket portion 32 and the sixth fastening member 50 of the second mount bracket portion 33 are coupled to each other by means of the mounting bolt 55, which are also shown in FIG. 2.

As mentioned above, the support system 14 for the power train 3 has the following structures when the first mount bracket portion 32 is viewed from the upper side of the vehicle body.

That is, the third fastening member 39 and the fourth fastening member 40 are placed to fasten the second mount bracket portion 33 to the upper end portion of the first vertical wall portion 34 apart from the second vertical wall portion 35 and to the upper end portion of the second vertical wall portion 35 apart from the first vertical wall portion 34, respectively. Further, the reinforcement member 45 adapted to couple the third fastening member 39 and the fourth fastening member 40 by straddling the projecting shift tower 5 is formed integrally with the second mount bracket portion 33.

Thus, the support system 14 couples the end portion of the first vertical wall portion 34 and the end portion of the second vertical wall portion 35 to each other via the reinforcement member 45 formed integrally with the second mount bracket portion 33, thereby suppressing the vibration of the first vertical wall portion 34 and the second vertical wall portion 35. Therefore, the support system 14 can increase resonance frequency of the first mount bracket portion 32 and reduce the vibration transmitted from the power train 3 to the left side frame 11 or left apron panel 13 of the vehicle body without changing material, increasing the number of parts, or causing cost increase.

Furthermore, in the support system 14 for the power train 3, the end portion opposite to the end portion at which the third fastening member 39 of the first vertical wall portion 34 is arranged so as to project from the intersecting portion 36 between the first vertical wall portion 34 and the second vertical wall portion 35, and the fifth fastening member 41 fastening the second mount bracket portion 33 is formed to the end portion on the side opposing to of the third fastening member 39 of the first vertical wall portion 34. According to such structure, the second reinforcing member 51 adapted to couple the fifth fastening member 41 and the fourth fastening member 40 is formed integrally with the second mount bracket portion 33.

Consequently, since the second reinforcing member 51 placed across the second vertical wall portion 35 from the reinforcement member 45 is formed integrally with the second mount bracket portion 33, the support system 14 can further suppress the vibration of the first vertical wall portion 34 and the second vertical wall portion 35, thereby increasing the resonance frequency of the first mount bracket portion 32 and further reducing the vibration transmitted from the power train 3 to the left side frame 11 or left apron panel 13 of the vehicle body.

It is finally to be noted that the present invention is not limited to the described embodiment, and many other changes and modifications may be made without departing from the scopes of the appended claims.

For example, in the embodiment described above, the end portion opposite to the end portion at which the third fastening member 39 of the first vertical wall portion 34 of the first mount bracket 32 is arranged so as to project from the intersecting portion between the first and second vertical wall portions 34 and 35. In addition, the fifth fastening member 41 is provided at the end portion on the side opposing to the third fastening member 39 of the first vertical wall portion 34 with the intersecting portion 36 being interposed therebetween, and the second reinforcing member 51 coupling the fifth fastening member 41 and fourth fastening member 40 together is formed integrally with the second mount bracket portion 33. However, the end portion opposite to the end portion of the second vertical wall portion 35 of the first mount bracket portion 32 at which the fourth fastening member 40 is arranged may be configured to project from the intersecting portion 36 between the first vertical wall portion 34 and the second vertical wall portion 35, moreover, the fifth fastening member 41 adapted to fasten the second mount bracket portion 33 may be placed to the end portion of the second vertical wall portion 35 opposite to the above-mentioned end portion with the intersecting portion 36 being interposed therebetween, and the second reinforcing member adapted to couple the fifth fastening member and third fastening member 39 may be formed integrally with the second mount bracket portion 33.

The present invention can not only increase the rigidity of a mount bracket split into two parts to thereby reduce propagation of vibrations, but also ensure the strength and rigidity of brackets other than mount brackets due to the effect by the combination.

What is claimed is:

1. A support system for a power train of a vehicle having a vehicle body which is mounted with a power train including an engine and a transmission, the support system comprising:

a mount insulator mounted to the vehicle body and provided with a coupling member;

a mount bracket coupled with an end portion of a shaft extending in a vertical direction of the vehicle body by way of the coupling member, the mount bracket including: a first mount bracket portion extending upward from an upper portion of the power train having a projection projecting upward therefrom; and a second mount bracket portion extending horizontally from an upper end of the first mount bracket portion and coupled to the coupling member, in which the first mount bracket portion includes: a first vertical wall portion extending in a longitudinal direction of the vehicle body along a side portion of the projection projecting upward from the power train so as not to contact the first vertical wall portion; and a second vertical wall portion intersects the first vertical wall portion and extends in the longitudinal direction of the vehicle body along the side portion of the projection;

first and second fastening members formed to lower end portions of the first and second vertical wall portions, respectively, the first and second fastening members being coupled with the power train;

third and fourth fastening members fastening the second mount bracket portion to an upper end portion of the first vertical wall portion apart from the second vertical wall portion and to an upper end portion of the second vertical wall portion apart from the first vertical wall portion, respectively, as viewed from an upper side of the vehicle body; and a reinforcing member formed integrally with the second mount bracket portion in a manner of connecting the third and fourth fastening members by straddling over the projection formed to the power train.

2. The support system for a power train of a vehicle according to claim 1, wherein the end portion opposite to the end portion at which the third fastening member of the first vertical wall portion is provided, or the end portion opposite to the end portion at which the fourth fastening member of the second vertical wall portion is provided is disposed so as to project from an intersecting portion between the first vertical wall portion and the second vertical wall portion.

3. The support system for a power train of a vehicle according to claim 1, further comprising: a fifth fastening member adapted to fasten the second mount bracket portion and disposed at the end portion of the first vertical wall portion opposite to the third fastening member or the end portion of the second vertical wall portion opposite to the fourth fastening member; and a further reinforcing member adapted to couple the fifth fastening member and the third fastening member or to couple the fifth fastening member and the fourth fastening member, the second reinforcing member being formed integrally with the second mount bracket portion.

* * * * *